(12) United States Patent
Suetake et al.

(10) Patent No.: US 6,318,169 B1
(45) Date of Patent: Nov. 20, 2001

(54) HEAT SENSITIVE FLOW METER

(75) Inventors: Naruki Suetake; Minoru Abe, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,346

(22) Filed: Sep. 14, 1999

(30) Foreign Application Priority Data

Mar. 10, 1999 (JP) .................................................. 11-064088

(51) Int. Cl.[7] ........................................................ G01F 1/68
(52) U.S. Cl. ........................................................ 73/204.15
(58) Field of Search ............................ 73/204.15, 204.16, 73/204.17

(56) References Cited

U.S. PATENT DOCUMENTS 5,415,029 * 5/1995 Uchiyama et al. ................. 73/118.2
5,703,288 * 12/1997 Horiguchi et al. ................. 73/204.26

FOREIGN PATENT DOCUMENTS 7-63588    3/1995 (JP) .

* cited by examiner

Primary Examiner—Harshad Patel
Assistant Examiner—Corey D. Mack
(74) Attorney, Agent, or Firm—Sughrue, Mion, Zinn, Macpeak & Seas, PLLC

(57) ABSTRACT

A heat sensitive flow meter comprising a power source for changing an offset voltage $\Delta E$ at the time of application of a power voltage. The power source is connected to the non-inversion input terminal of an operation amplifier for amplifying a potential difference between a first heat sensitive element for measuring the temperature of a fluid and a second heat sensitive element which is cooled by the fluid. The heat sensitive flow meter can suppress an output error right after the application of a power voltage and shorten a target signal reach time.

6 Claims, 11 Drawing Sheets

HEAT SENSITIVE FLOW METER

BACKGROUND OF THE INVENTION

1. [Field of the Invention]

The present invention relates to a heat sensitive flow meter for detecting the flow rate of a fluid using heat sensitive elements.

2. [Description of the Prior Art]

In an electronically controlled fuel injector for a car engine, it is important to measure the quantity of intake air for an engine for the control of air/fuel ratio with high accuracy. A heat sensitive flow meter is used in an air flow detector. Two heat sensitive elements for detecting the flow rate of a fluid such as air are formed on a ceramic substrate by winding a temperature sensitive resistor film made from platinum or a platinum wire. The temperature of the fluid is detected by a first heat sensitive element making use of changes in the resistance of this heat sensitive element caused by temperature variations and a current is supplied to a second heat sensitive element so that the temperature of the second heat sensitive element becomes higher than the temperature of the first heat sensitive element by a predetermined temperature. When the second heat sensitive element is cooled by the flow of the fluid, a current supplied to maintain the second heat sensitive element at a predetermined temperature increases, and the flow rate of the fluid is measured from this change in current value. This control system is called "fixed temperature difference control system" or "fixed temperature control system".

This heat sensitive flow meter in which the first and second heat sensitive elements and a plurality of fixed resistors constitute a bridge circuit and this bridge circuit is controlled by an operation amplifier is already known. There is also known a technology for controlling the responsibility and safety of this bridge circuit by adjusting the off-set voltage of this operation amplifier to a predetermined value.

For example, FIG. 10 is a circuit diagram showing an example of a conventional heat sensitive flow meter, and FIG. 3(C) is a graph showing the waveform of output B when a power voltage is applied to this conventional heat sensitive flow meter. In FIG. 10, a terminal T to which a power voltage is applied is connected to the connector of a transistor 8, the emitter of the transistor 8 is connected to one end of a first heat sensitive element 1 and to one end of a second heat sensitive element 2, the other end of the first heat sensitive element 1 is connected to one end of a fixed resistor 3, the other end of the fixed resistor 3 is connected to one end of a fixed resistor 4 and to the inversion input terminal of an operation amplifier 7, and the other end of the fixed resistor 4 is grounded. The other end of the second heat sensitive element 2 is the output (V5) of the bridge circuit and connected to one end of a fixed resistor 5 and to the non-inversion input terminal of the operation amplifier 7 through a DC offset voltage 33. The output of the operation amplifier 7 is connected to the base of the transistor 8, and a current is supplied from a power source to the bridge circuit through the transistor 8 to maintain the balance of the bridge circuit. The above first heat sensitive element 1 is connected to a bridge branch SA and the second heat sensitive element 2 is connected to a bridge branch SB. The first and second heat sensitive elements 1 and 2 are placed at predetermined locations on the above ceramic substrate.

Describing the operation of this heat sensitive flow meter, when the flow rate of air increases, the second heat sensitive element 2 placed in the flow of air is cooled and the resistance value thereof decreases, thereby increasing the potential of a connection point between the second heat sensitive element 2 and the fixed resistor 5. This voltage change raises the non-inversion input voltage of the operation amplifier 7, an output voltage thereby rises, a current is supplied to the bridge circuit through the transistor 8, the second heat sensitive element 2 generates heat with this current, and the temperature of the second heat sensitive element 2 is thereby increased to maintain a fixed temperature difference between it and the first heat sensitive element 1. Generally speaking, as the operation amplifier 7 has primary delay characteristics and the second heat sensitive element 2 has a thermal delay, a fixed temperature difference control circuit shows secondary delay characteristics. Since the DC offset voltage 33 is provided for the stable operation of the secondary delay system, the circuit can operate stably at the entire range of flow rate.

Heat generated from the second heat sensitive element 2 is transmitted to the air and to a support section for supporting the second heat sensitive element 2 and consumed as a loss. When a power voltage is applied, a heat transmission loss to this support section cannot be ignored and this heat transmission gradually changes over a long time. For example, when a power voltage is applied, as shown in the output B of FIG. 3(A), a flow signal shows a tendency to gradually reach a final flow rate from a flow rate a little higher than the final flow rate.

It is known that, when the flow rate sharply changes, responsibility is reduced by the influence of a heat transmission loss to the support section. As the prior art for improving responsibility, FIG. 11 shows a fixed temperature difference control circuit for a heat sensitive flow meter disclosed by Japanese Laid-open Patent Application No. 7-63588. When this circuit is compared with the circuit of FIG. 10, a differential circuit 34 is connected to the output of the bridge circuit comprising the second heat sensitive element 2 and the fixed resistor 5, and the output of the differential circuit 34 is divided into two and connected to comparators 35 and 36, the outputs of the comparators 35 and 36 are integrated and connected to a constant current circuit 37, and the output of the constant current circuit 37 is connected to the non-inversion input terminal of the operation amplifier 7. One end of a fixed resistor 6 is connected to the non-inversion input terminal of the operation amplifier 7 and the other end of the fixed resistor 6 is connected to the outputs of the second heat sensitive element 2 and the fixed resistor 5 to form a loop, and the output of a constant current circuit 38 is connected to the non-inversion input terminal of the operation amplifier 7. This constant current circuit 38 is driven by a voltage Vcc obtained by dividing a power voltage by unshown resistors and controlled by the feedback control of the loop to supply an offset voltage ΔE.

When the flow rate sharply changes, the feed-back control is carried out according to a flow change signal to temporarily change this offset voltage ΔE, thereby improving resposibility.

In the prior art, when the heat sensitive elements 1 and 2 generate heat by the application of a power voltage, they transmit heat to the support section and then become stable at a predetermined temperature. Therefore, it takes time to reach a target signal, thereby deteriorating stability at the time of application of a power voltage and causing an output error until the heat sensitive elements 1 and 2 become stable.

In a heat sensitive flow meter disclosed by Japanese Laid-open Patent Application No. 7-63588, responsibility is improved by temporarily changing the offset voltage ΔE according to a flow change signal. However, since the heat sensitive elements become stable after they transmit heat to the support section, the influence of an output error at the time of application of a power voltage is not cancelled. In addition, when the heat sensitive elements 1 and 2 having low responsibility are used and the offset voltage ΔE is temporarily changed according to a flow signal, the output of the bridge circuit readily oscillates due to feedback control, especially at the time of application of a power voltage.

SUMMARY OF THE INVENTION

The present invention has been made to eliminate the above problems of the prior art and is aimed to suppress an output error right after the application of a power voltage without carrying out feedback control and shorten a target signal reach time.

According to a first aspect of the present invention, there is provided a heat sensitive flow meter in which a power source for supplying an offset voltage to the input circuit of a differential amplifier is provided and an offset voltage changing means for temporarily changing the offset voltage at the time of application of a power voltage is provided.

According to a second aspect of the present invention, there is provided a heat sensitive flow meter in which the offset voltage changing means adds the offset voltage at the time of application of a power voltage and gradually reduces the offset voltage.

According to a third aspect of the present invention, there is provided a heat sensitive flow meter in which the offset voltage changing means subtracts the offset voltage at the time of application of a power voltage and gradually reduces the offset voltage.

According to a fourth aspect of the present invention, there is provided a heat sensitive flow meter in which the offset voltage changing means is composed of a primary filter circuit and the time constant of the filter circuit is set to almost the same value as the heat time constant of the second heat sensitive element.

According to a fifth aspect of the present invention, there is provided a heat sensitive flow meter in which the offset voltage changing means is composed of a secondary or higher-order filter circuit and the time constant of this filter circuit is set to almost the same value as the heat time constant of the second heat sensitive element.

The above and other objects, features and advantages of the invention will become more apparent from the following description when taken in conjunction with the accompanying drawings.

BRIEF DESCRIPTION OF THE ACCOMPANYING DRAWINGS

Figure 3A:
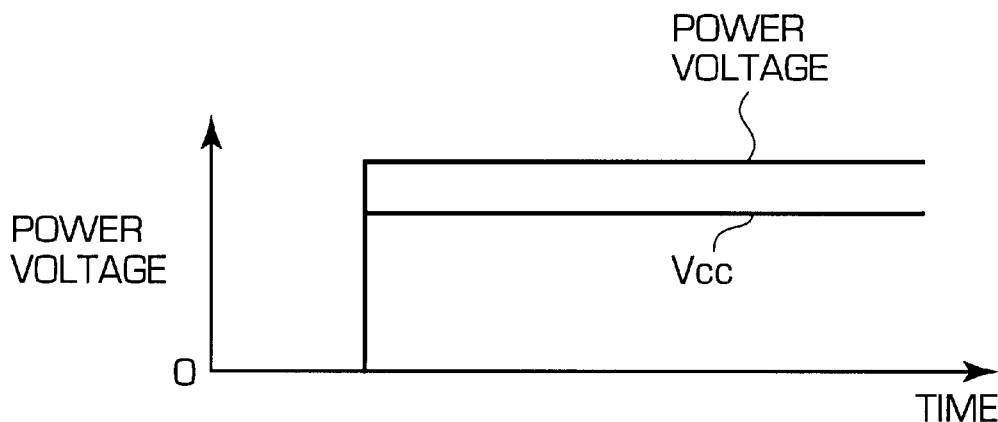
Figure 3B:
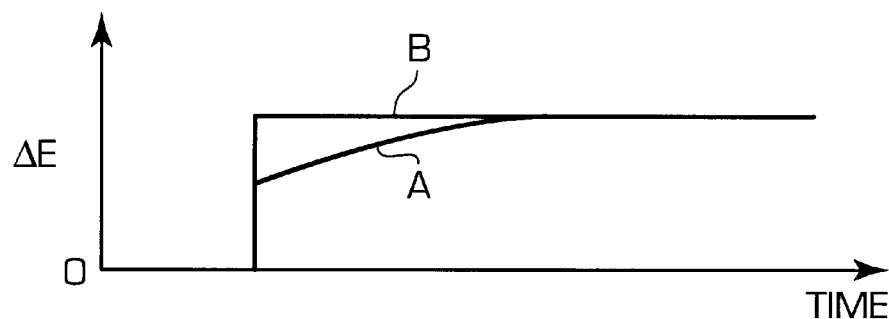
Figure 3C:
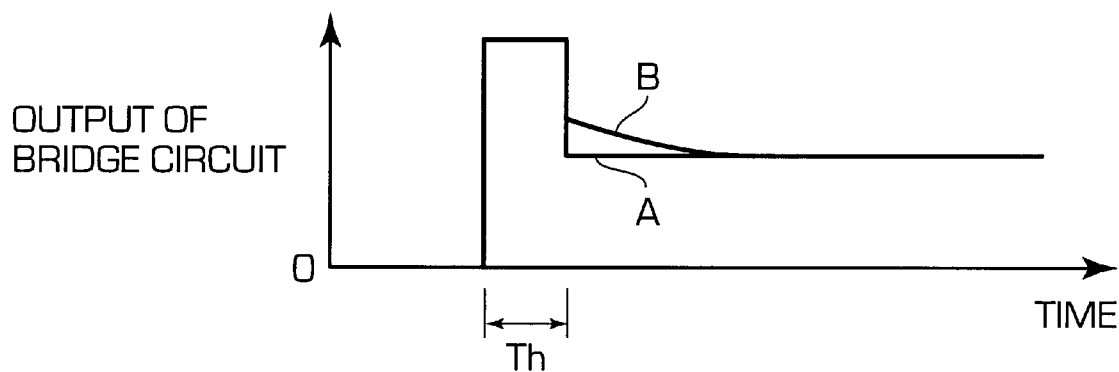
Figure 4:
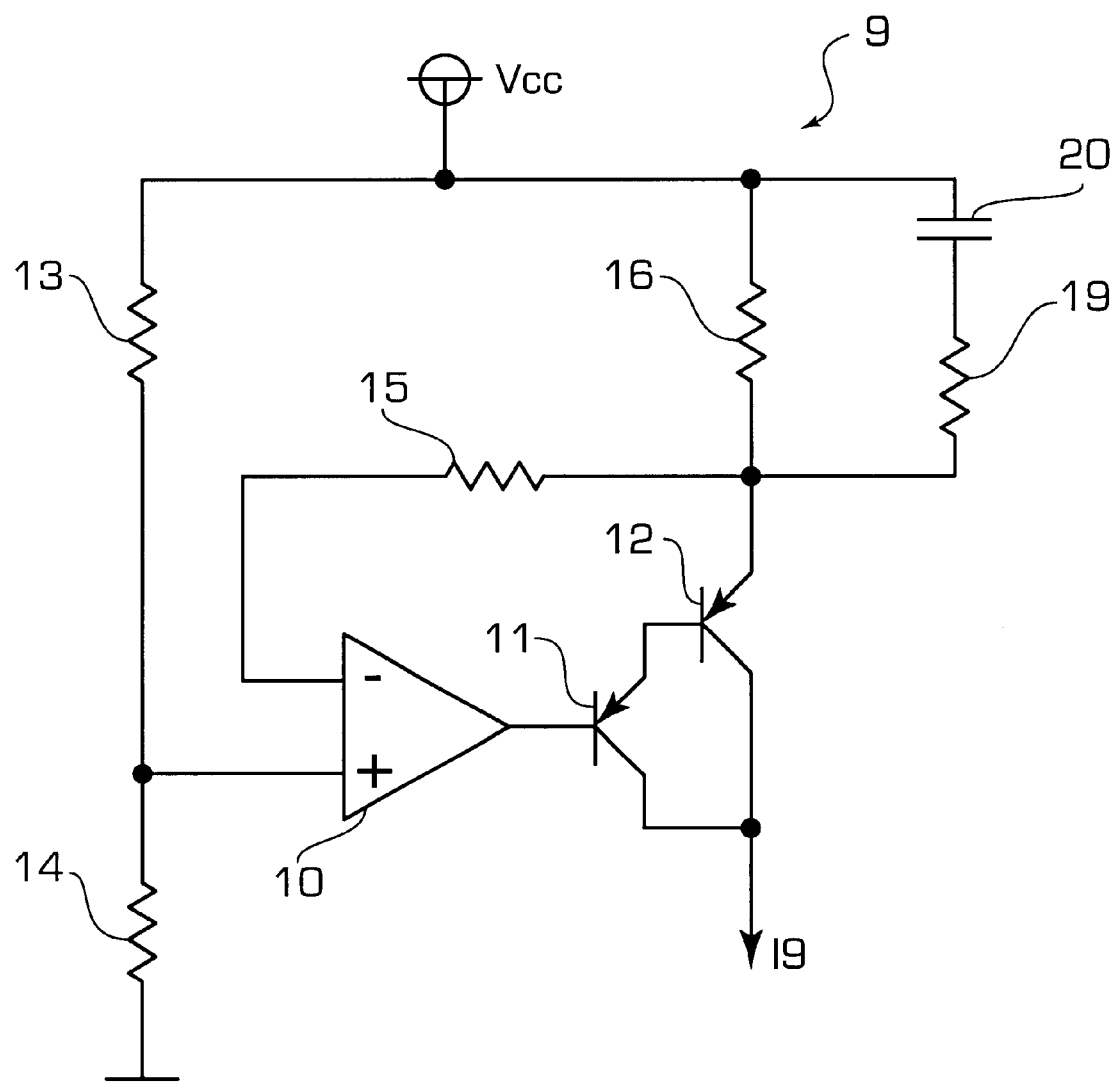
Figure 5A:
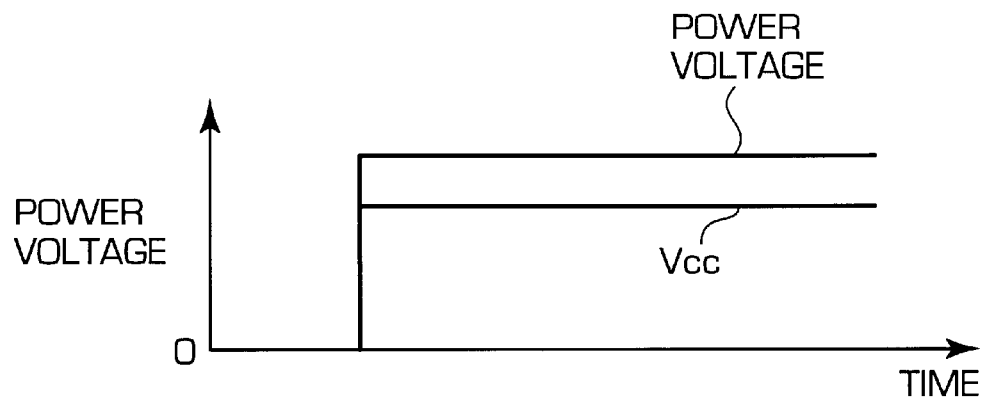
Figure 5B:
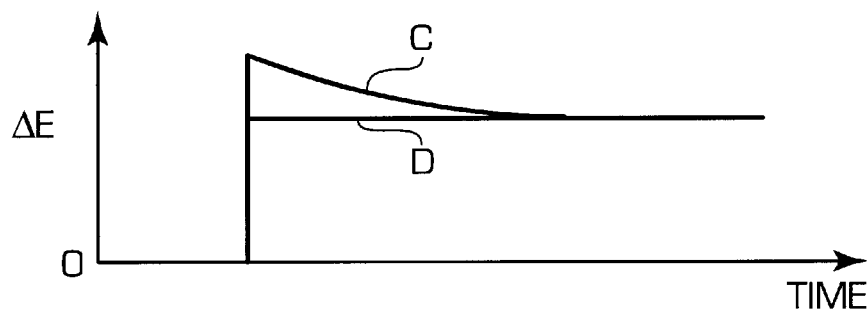
Figure 5C:
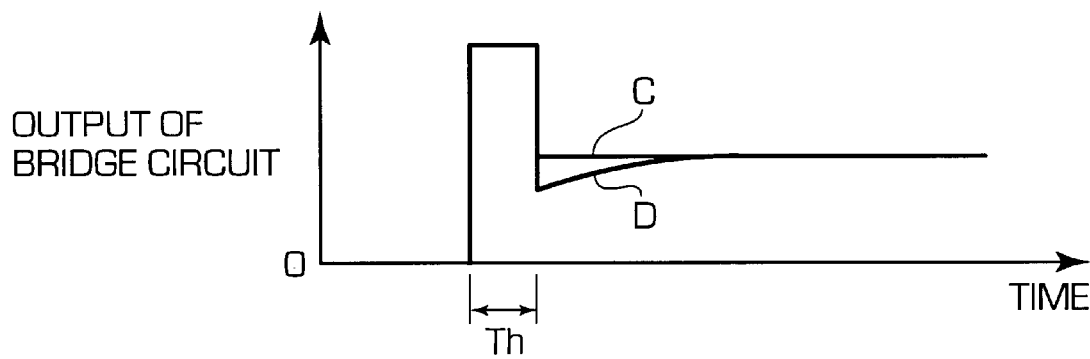
Figure 6B:
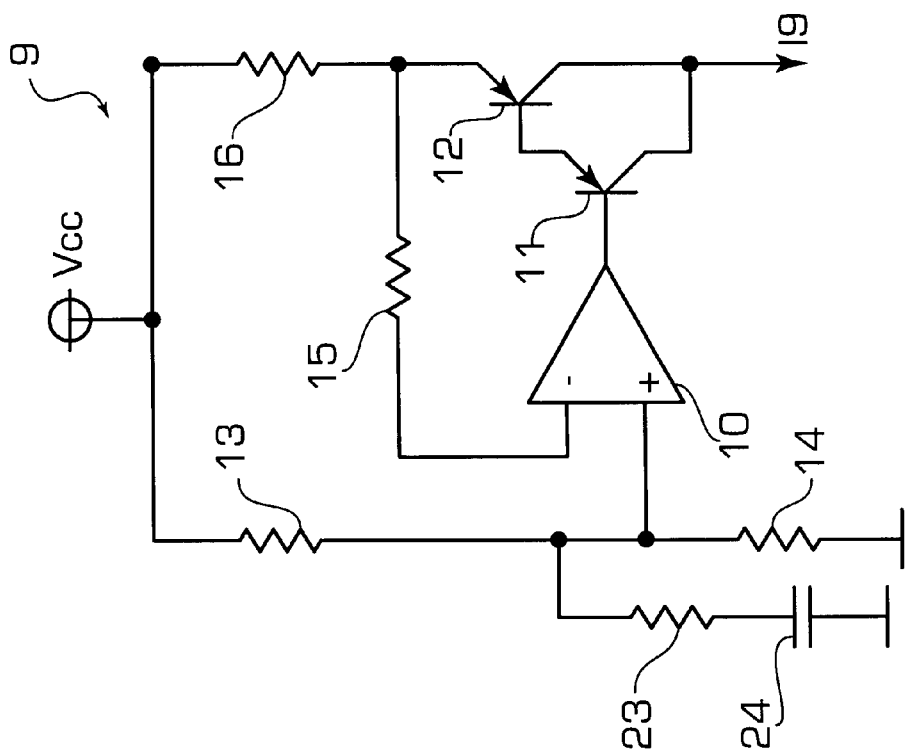
Figure 6A:
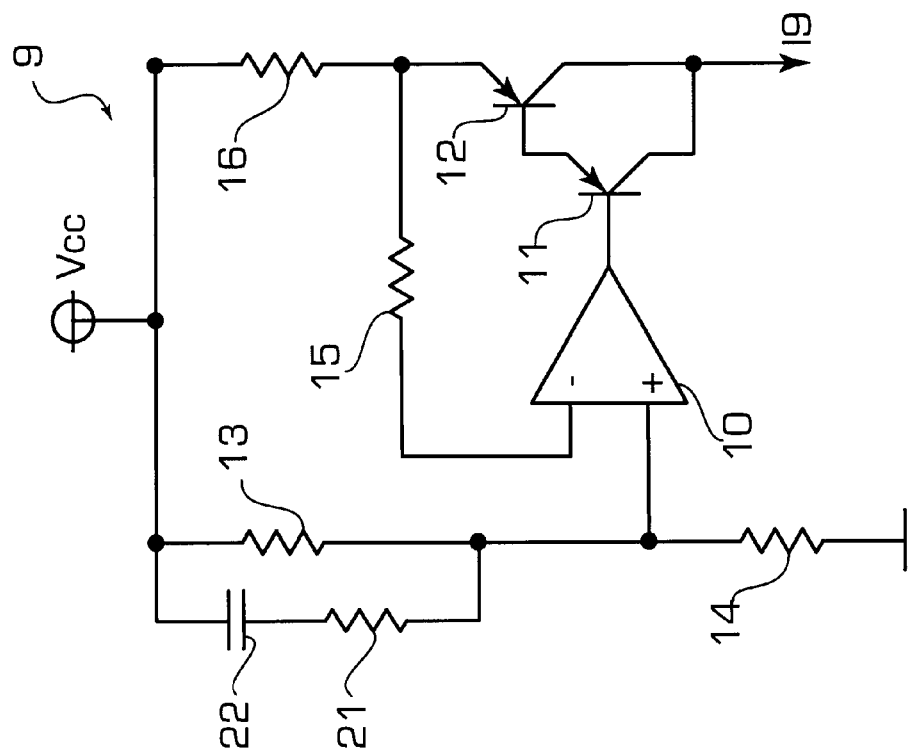
Figure 7B:
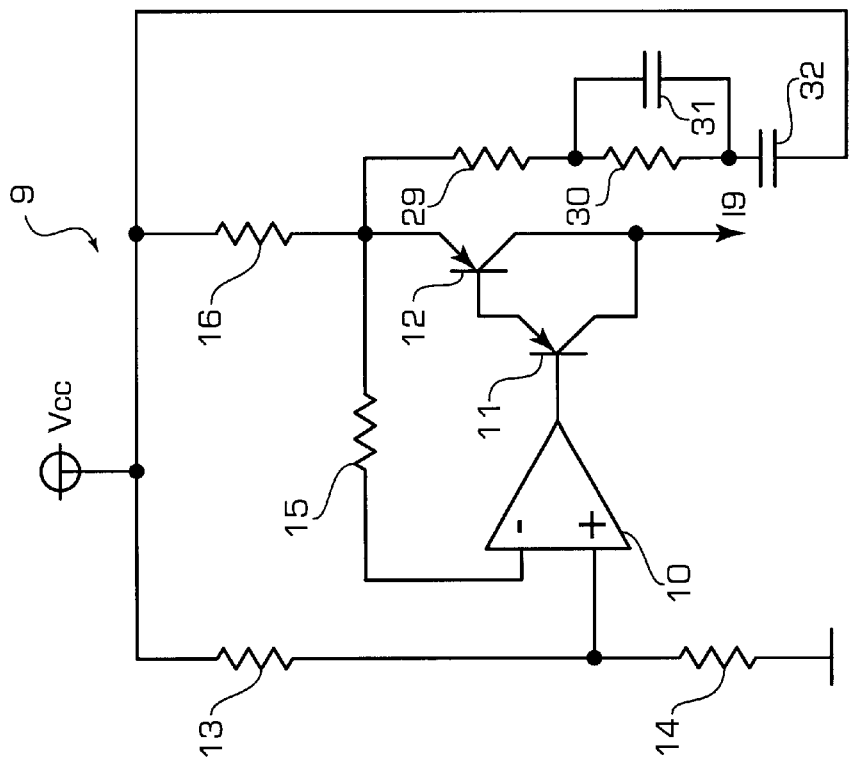
Figure 7A:
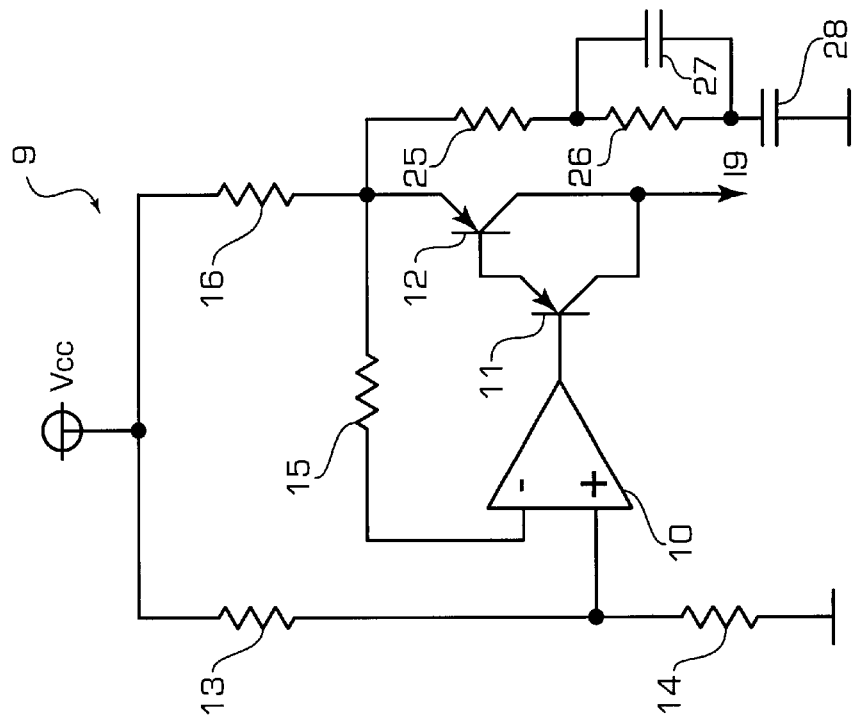
Figure 8:
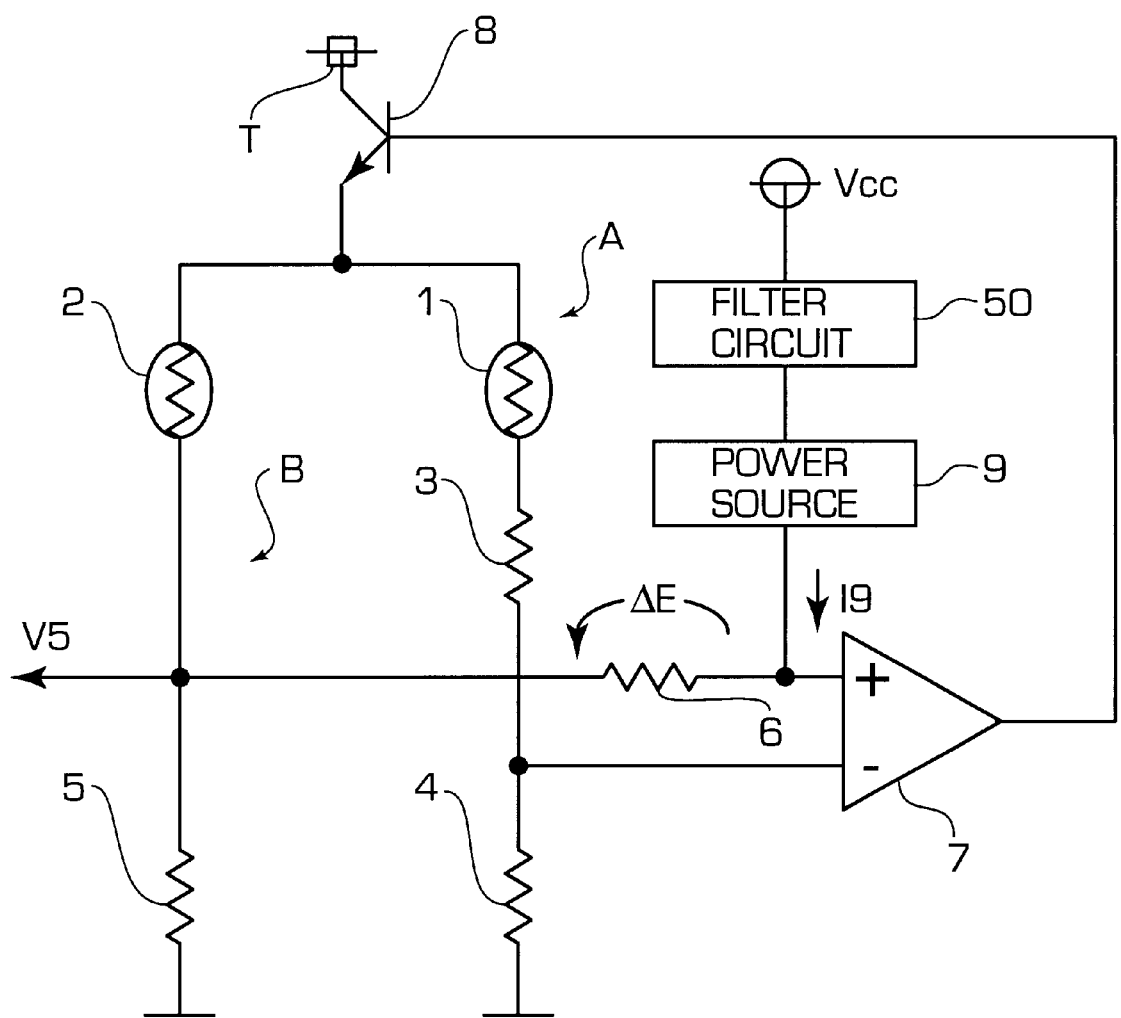
Figure 9A:
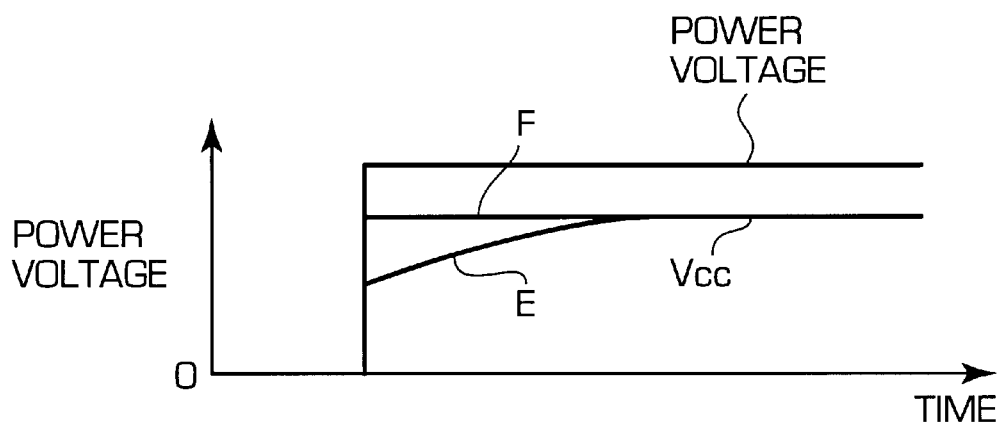
Figure 9B:
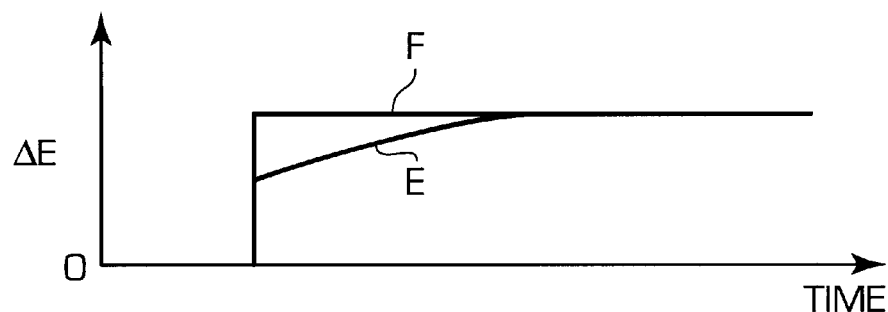
Figure 9C:
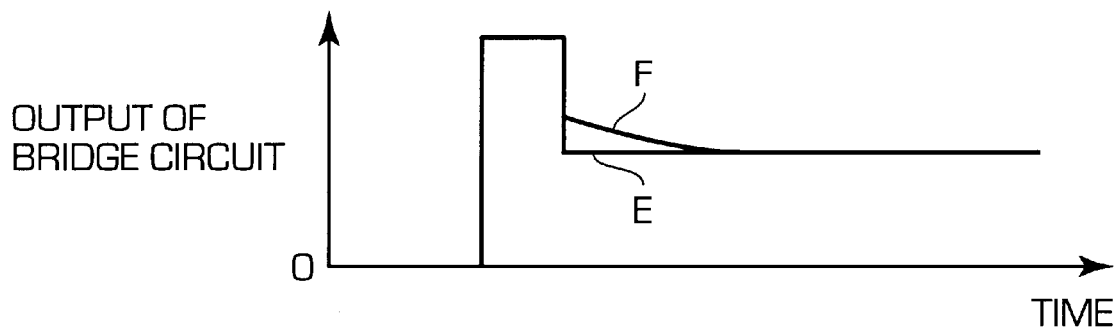
Figure 10:
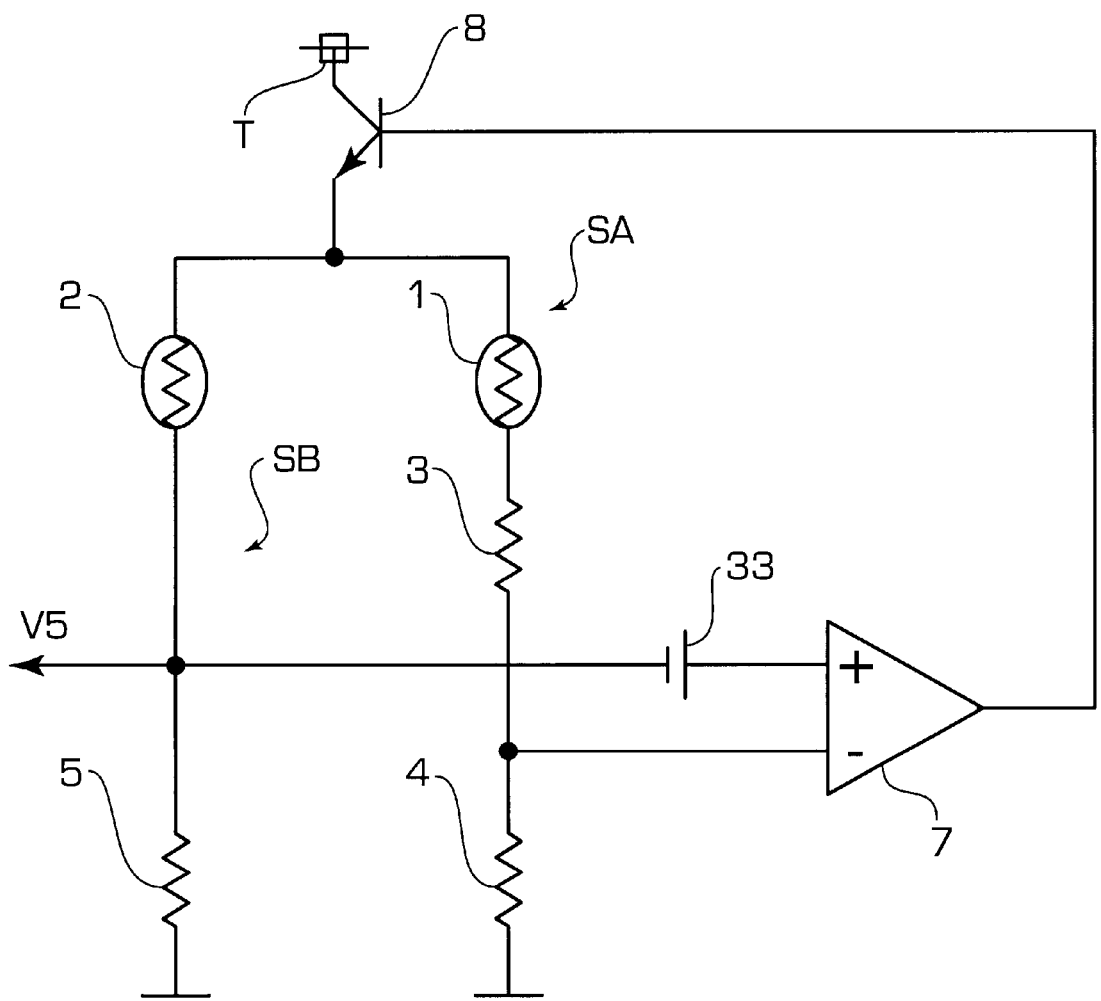
Figure 11:
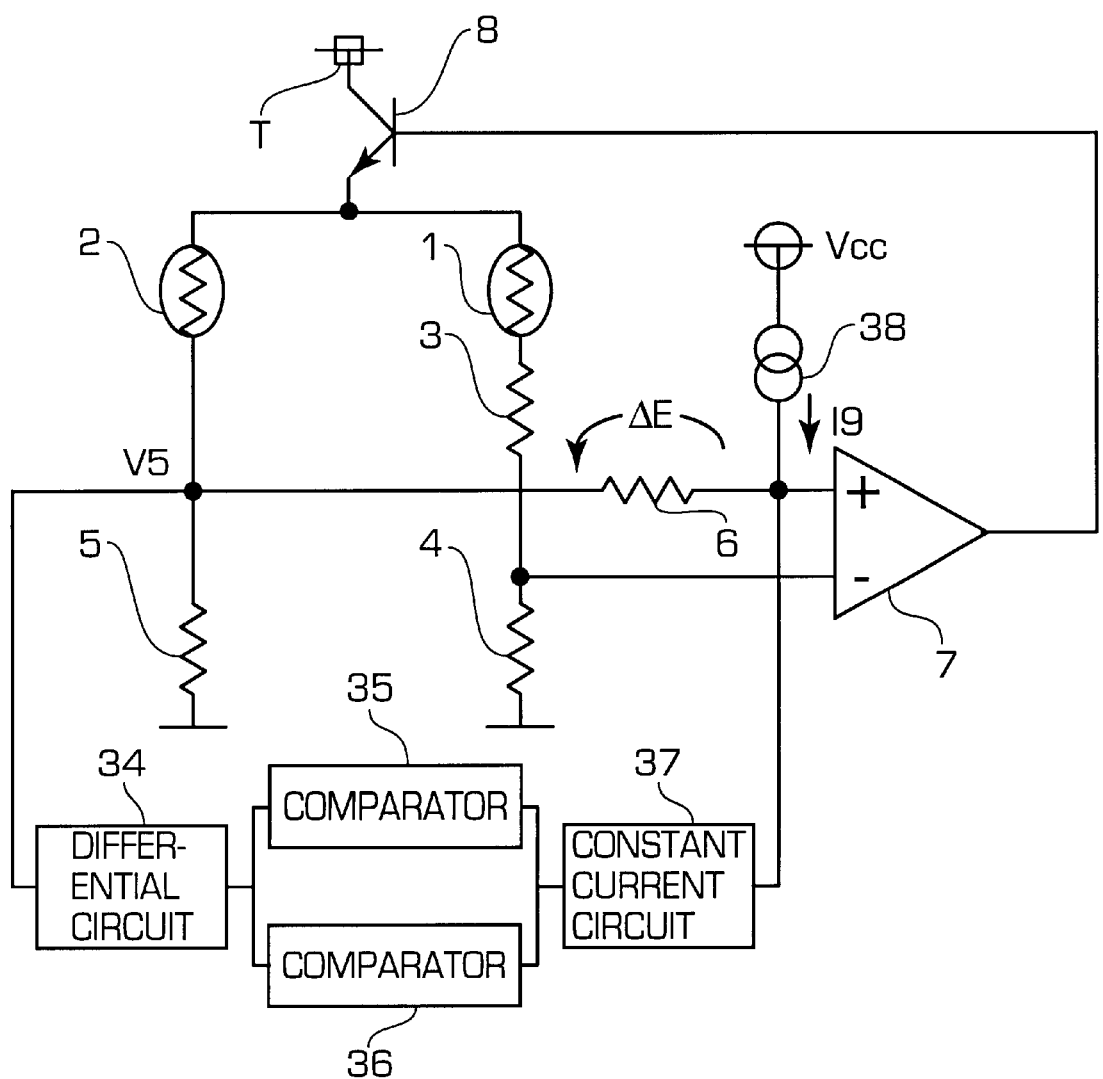

FIGS. 3(A), 3(B) and 3(C) are graphs showing power source, offset voltage and output waveforms according to Embodiment 1;

FIG. 4 is a circuit diagram showing the constitution of a power source according to Embodiment 2 of the present invention;

FIGS. 5(A), 5(B) and 5(C) are graphs showing power source, offset voltage and output waveforms according to Embodiment 2;

FIGS. 6(A) and 6(B) are circuit diagrams showing the constitutions of power sources according to Embodiment 3 of the present invention;

FIGS. 7(A) and 7(B) are circuit diagrams showing the constitutions of power sources according to Embodiment 4 of the present invention;

FIG. 8 is a circuit diagram showing the constitution of a fixed temperature difference control circuit according to Embodiment 5 of the present invention;

FIGS. 9(A), 9(B) and 9(C) are graph showing a power source, offset voltage and output waveforms according to Embodiment 5;

FIG. 10 is a circuit diagram showing the constitution of a heat sensitive flow meter of the prior art; and FIG. 11 is a circuit diagram showing the constitution of a heat sensitive flow meter of the prior art.

DETAILED DESCRIPTION OF THE PREFERRED EMBODIMENTS

Preferred Embodiments of the present invention will be described hereinafter with reference to the accompanying drawings.

Embodiment 1

Figure 1:
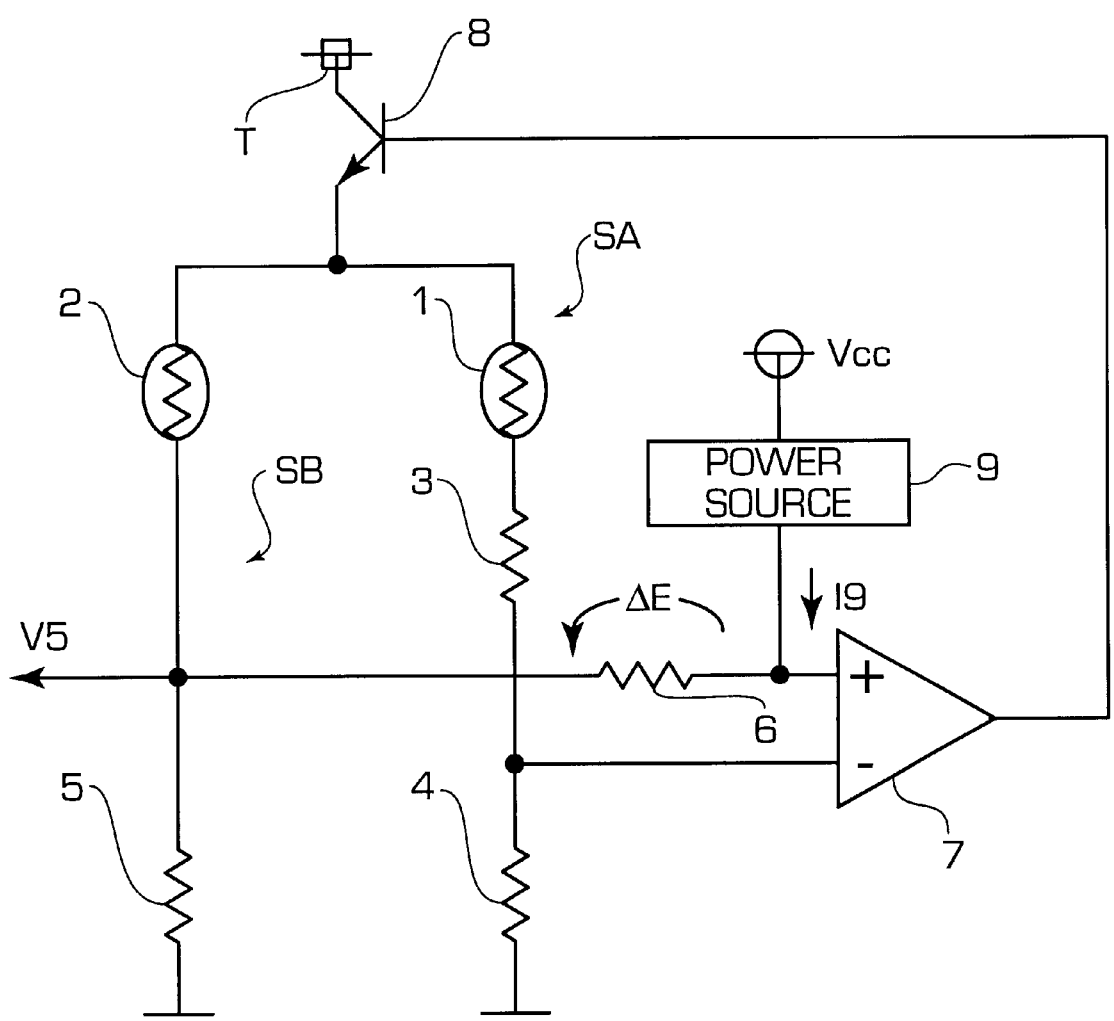
FIG. 1 is a circuit diagram showing the constitution of the fixed temperature difference control circuit of a heat sensitive flow meter according to Embodiment 1 of the present invention.
Figure 2:
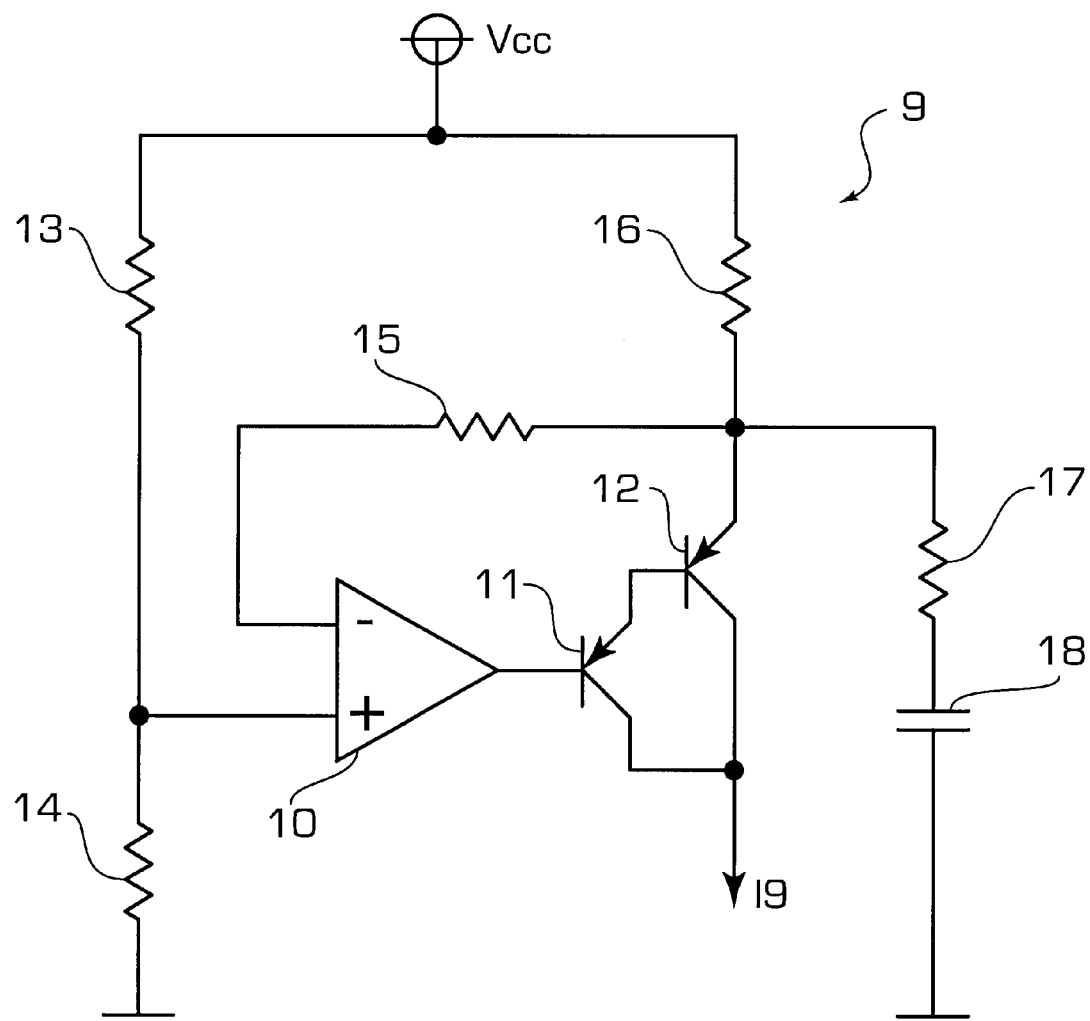
FIG. 2 is a circuit diagram showing the constitution of a power source according to Embodiment 1.

FIG. 1 is a circuit diagram showing an example of the fixed temperature difference control circuit of a heat sensitive flow meter according to Embodiment 1 of the present invention, FIG. 2 is a circuit diagram of a power source, and FIGS. 3(A), 3(B) and 3(C) are graphs showing power voltage, offset voltage and output waveforms, respectively. In these figures, the same or corresponding elements as those of FIG. 10 and FIG. 11 are given the same reference numerals.

In this Embodiment 1, reference numeral 1 denotes a first heat sensitive element for detecting the temperature of a fluid, 2 a second heat sensitive element which generates heat when a heating current is supplied, and 3, 4, 5 and 6 fixed resistors. The heat sensitive elements 1 and 2, and the fixed resistors 3, 4, 5 and 6 constitute a bridge circuit. Denoted by 7 is an operation amplifier as a differential amplifier for amplifying the imbalanced voltage of the bridge circuit, 8 a transistor as a power amplifier for supplying a current to the bridge circuit, and 9 a power source whose output is connected to the non-inversion input terminal of the operation amplifier 7 and which incorporates a filter circuit as an offset voltage changing means and is driven with a voltage Vcc which is turned on simultaneously with the application of a power voltage. A source current I9 which is controlled by the filter circuit flows into the fixed resistor 6 (resistance value R6) connected to the non-inversion input terminal of the operation amplifier 7 to supply an offset voltage ΔE (I9×R6) to the non-inversion input terminal of the operation amplifier 7.

Since it takes time (heat time constant) for the second heat sensitive element 2 to become stable at a predetermined resistance value right after the application of a power voltage, the voltage of the second heat sensitive element 2 reaches a predetermined value with a thermal delay. During this time, the output V5 of the bridge circuit changes and an error is generated. To cancel this voltage change of the output V5 of the bridge circuit, the time constant τ of the filter circuit is adjusted to the same value as the above heat time constant in advance, the current I9 is supplied to the fixed resistor 6 from the power source 9 to form an offset voltage ΔE, this offset voltage ΔE is added to the voltage V5 of the second heat sensitive element 2, and the obtained total voltage is supplied to the operation amplifier 7. Thus, an output error at the time of application of a power voltage is eliminated without the feedback control of the operation amplifier 7. Since the output V5 of the bridge circuit reaches a target signal without generating an output error, the target signal reach time can be shortened.

FIG. 2 shows the internal configuration of the power source 9 which comprises an operation amplifier 19, transistors 11 and 12, fixed resistors 13, 14, 15, 16 and 17 and a capacitor 18. The fixed resistor 17 and the capacitor 18 constitute a primary filter circuit. One end of the fixed resistor 13 is connected to a terminal to which a voltage Vcc is supplied, the other end of the fixed resistor 13 is connected to one end of the fixed resistor 14, the other end of the fixed resistor 14 is grounded, and the fixed resistors 13 and 14 are connected to the non-inversion input terminal of the operation amplifier 10. To the terminal to which the voltage Vcc is supplied is connected one end of the fixed resistor 16, the other end of the fixed resistor 16 is connected to one end of the fixed resistor 15, and the other end of the fixed resistor 15 is connected to the inversion input terminal of the operation amplifier 10. The other end of the fixed resistor 16 is connected to one end of the fixed resistor 17, the other end of the fixed resistor 17 is connected to one end of the capacitor 18, and the other end of the capacitor 18 is grounded. The other end of the fixed resistor 16 is connected to the emitter of the transistor 12, the base of the transistor 12 is connected to the emitter of the transistor 11, and the base of the transistor 11 is connected to the output of the operation amplifier 10. The collector terminals of the transistors 11 and 12 are connected to each other, and the source current I9 supplied from these collector terminals flows into the fixed resistor 6 to supply the offset voltage $\Delta E$ to the operation amplifier 7. A voltage is gradually charged into the filter circuit on the inversion input terminal side of the operation amplifier 10 so that a current gradually rises and becomes stable at a predetermined value. The resistance values of the fixed resistors 13, 14, 15, 16 and 17 are represented by R13, R14, R15, R16 and R17, respectively, and the capacity of the capacitor 18 is represented by C18.

The time constant $\tau$ (R17×C18) of the filter circuit composed of the fixed resistor 17 and the capacitor 18 is adjusted to the same value as the heat time constant of the second heat sensitive element 2 in advance. This heat time constant is directly measured by applying a constant current or constant voltage to the second heat sensitive element 2 and the time constants $\tau$ of the filter circuit is adjusted to the same value as this heat time constant. This time constant $\tau$, which differs according to the heat capacity of the second heat sensitive element 2, is several tens of seconds at the most.

Since the first heat sensitive element 1 rarely generates heat compared with the second heat sensitive element 2, the heat time constant of the first heat sensitive element 1 rarely has an influence upon the heat time constant of the second heat sensitive element 2. However, when the first heat sensitive element 1 generates heat of itself or the temperature of the first heat sensitive element 1 is changed by heat generated by the second heat sensitive element 2, the heat time constant of the first heat sensitive element 1 has a slight influence upon the heat time constant of the second heat sensitive element 2.

However, even when this influence exists, the time constant $\tau$ of the filter circuit may be set to cancel a total heat time constant as it is considered that only the second heat sensitive element 2 has the total heat time constant on the basis of the heat time constant of the first heat sensitive element 1 because the bridge circuit is a differential circuit for comparing the heat sensitive elements 1 and 2. To measure this total heat time constant, the total time constant of the bridge circuit may be measured while the final output waveform of a flow meter is monitored with an oscilloscope or the like. That is, the time required for the output V5 to reach a target signal without operating the power source 9, that is, a voltage change delay time may be measured.

When the heat time constant of the first heat sensitive element 1 has an influence, it may be considered that only the first heat sensitive element 1 has the total heat time constant on the basis of the heat time constant of the second heat sensitive element 2. To cancel this total heat time constant, the power source 9 and the fixed resistor 6 are connected to the inversion terminal of the operation amplifier 7 to supply an offset voltage so as to eliminate an output error. This is the same as described above in that the total heat time constant is corrected though the basis is different.

A description is subsequently given of the operation of this fixed temperature difference control circuit with reference to FIGS. 3(A), 3(B) and 3(C). The output A of the circuit of this Embodiment when a power voltage is applied to the terminal T at the timing shown in FIG. 3(A) is compared with the output B of the prior art circuit. FIG. 3(A) shows a power voltage and Vcc, FIG. 3(B) shows the waveform of the offset voltage $\Delta E$, and FIG. 3(C) shows the waveform of the output V5 of the bridge circuit. When a power voltage is applied at the timing shown in FIG. 3(A), a voltage equal to a voltage at both ends of the fixed resistor 13 is generated at both ends of the fixed resistor 16 in FIG. 2, and a current I16 represented by the following equation flows into the fixed resistor 16.

$$I16=Vcc/(R13+R14)\times R13/R16$$

Meanwhile, a current is charged into the capacitor 18 with a time constant $\tau$ (C18×R17) and the charged current I18 is represented by the following equation when an initial value thereof is represented by Is and a final value thereof is represented by Ie.

$$Is=Vcc/(R13+R14)\times R14/R17$$

$$Ie=0$$

That is, the current I18 flowing into the capacitor 18 gradually decreases from its initial value and becomes null, and is charged into the capacitor 18 so that the emitter current of the transistor 12 rises from its initial value to a predetermined value. Therefore, a current It flowing into the transistors 11 and 12 changes from its initial value according to the current I18, that is, it decreases from its initial value and becomes stable at a predetermined value. Since the source current I9 is supplied from the transistors 11 and 12 according to the change of this current It, the source current I9 gradually decreases from its initial value and becomes stable at a predetermined value. Since the product of the source current I9 and the resistance of the fixed resistor 6 is the offset voltage $\Delta E$, the offset voltage $\Delta E$ right after the application of a power voltage is added to the voltage of the non-inversion input terminal of the operation amplifier 7 as an initial value $\Delta Es$. Thereafter, the offset voltage $\Delta E$ decreases and becomes stable at a final value $\Delta Ee$. The initial value $\Delta Es$ is represented by the following equation.

$$\Delta Es=(Vcc/(R13+R14)\times(R13/R16-R14/R17)\times R6$$

The final value $\Delta Ee$ changes as shown by the following equation.

$$\Delta Ee=(Vcc/(R13+R14)\times(R13/R16))\times R6$$

To cancel the output B of the prior art as the output V5 of the bridge circuit, the offset voltage ΔE gradually changes from its initial value ΔEs during a time Th to a predetermined value as shown by the output A of the present invention.

In FIG. 3(C), the time Th is required to initially heat the second heat sensitive element 2. Since the second heat sensitive element 2 does not generate heat until the resistance value thereof reaches a predetermined value during this time Th, the bridge circuit supplies the maximum current from the transistor 8 to the second heat sensitive element 2 to generate heat. That is, as the bridge circuit does not start regular control, the operation amplifier 7 operates to supply the maximum current and outputs a voltage as high as the power voltage of the operation amplifier 7. Therefore, the output V5 becomes high during the time Th. Meanwhile, in the power source 9, the source current I9 is controlled by the filter circuit to cancel the error of the output V5. Since the offset voltage ΔE changes gradually, when the bridge circuit starts regular control after the time Th, the output V5 of the present invention becomes stable at a target signal right after the time Th unlike the output B of the prior art which becomes stable gradually at a target signal. Therefore, it is possible to shorten the time required for the output V5 of the bridge circuit to become stable at the target signal.

The output V5 of the bridge circuit increases linearly together with the offset voltage ΔE when the flow rate is fixed. Therefore, when the time constant τ is set to substantially the same value as the heat time constant, an error caused by the influence of a heat transmission loss of the heat sensitive elements 1 and 2 to the support section can be apparently cancelled, thereby making it possible to shorten the target signal reach time at the time of application of a power voltage.

According to the above constitution, since the offset voltage ΔE of the operation amplifier 7 for controlling the bridge circuit is temporarily changed only at the time of application of a power voltage, an error at the time of the heat generation of the heat sensitive elements 1 and 2 can be corrected and a more accurate output V5 can be obtained.

Embodiment 2

In the above Embodiment 1, the power source 9 in which the other end of the capacitor 18 of the filter circuit is grounded to the earth has been described. In this Embodiment 2, as shown in FIG. 4, one end of a capacitor 20 is connected to a terminal to which Vcc is supplied, the other end of the capacitor 20 is connected to one end of a fixed resistor 19, the other end of the fixed resistor 19 is connected to the fixed resistors 15 and 16 and to the emitter of the transistor 12, and a filter circuit composed of the fixed resistor 19 (resistance value R19) and the capacitor 20 (capacitance value C18) constitutes the power source 9. In this Embodiment 2, as shown in FIG. 5(C), the circuit operation of the prior art is assumed to be such that the output V5 of the bridge circuit gradually rises right after the application of a power voltage as shown by output D. The reason why the output changes like this is that the heat of the support section transmitted from the second heat sensitive element 2 has an influence upon the temperature measurement of the first heat sensitive element 1. To cancel this influence, the time constant of the filter circuit is adjusted in advance to cancel the total heat time constant of the second heat sensitive element 2. Therefore, even if the heat of the support section transmitted from the second heat sensitive element 2 exists, an output error can be eliminated without influencing the temperature measurement of the first heat sensitive element 1. In this case, the feedback control of the operation amplifier is not carried out as well.

A description is subsequently given of the operation of this fixed temperature difference control circuit with reference to FIGS. 5(A), 5(B) and 5(C). The output C of this Embodiment is compared with the output D of the prior art circuit when a power voltage is applied at the timing shown in FIG. 5(A). FIG. 5(A) shows the waveforms of a power voltage and Vcc, FIG. 5(B) shows the waveform of an offset voltage ΔE and FIG. 5(C) shows the waveform of the output V5 of the bridge circuit. When a power voltage is applied at the timing shown in FIG. 5(A), a voltage equal to a voltage at both ends of the fixed resistor 13 is generated at both ends of the fixed resistor 16 in FIG. 4, and a current I16 represented by the following equation flows into the fixed resistor 16.

$$I16=Vcc/(R13+R14)\times R13/R16$$

Meanwhile, a current is charged into the capacitor 20 with a time constant τ (C20×R19) and the charged current I20 is represented by the following equation when its initial value is represented by Is and its final value is represented by Ie.

$$Is=Vcc/(R13+R14)\times R13/R20$$

$$Ie=0$$

That is, the current I20 flowing into the capacitor 20 gradually decreases from its initial value Is and becomes null, and is charged into the capacitor 20 so that the potential of the emitter terminal of the transistor 12 falls from its initial value to a predetermined value. Therefore, as a current It flowing into the transistors 11 and 12 changes from its initial value according to the current I20, it gradually decreases from its initial value and becomes stable at a predetermined value. Since the source current I9 is supplied from the transistors 11 and 12 along with the change of this current It, it gradually decreases from its initial value and becomes stable at a predetermined value. Since the product of the source current I9 and the resistance value of the fixed resistor 6 becomes the offset voltage ΔE, the offset voltage ΔE right after the application of a power voltage is subtracted from the voltage of the non-inversion input terminal of the operator amplifier 7 as an initial value ΔEs. Thereafter, the offset voltage ΔE decreases and becomes stable at a final value ΔEe. The initial value ΔEs is represented by the following equation.

$$\Delta Es=(Vcc/(R13+R14)\times(R13/R16+R13/R20))\times R6$$

The final value ΔEe changes as shown by the following equation.

$$\Delta Ee=(Vcc/(R13+R14)\times(R13/R16))\times R6$$

Meanwhile, since the output V5 of the bridge circuit increases linearly together with ΔE when the flow rate is fixed, when the above time constant is set to substantially the same value as the heat time constant as in Embodiment 1, an error can be apparently cancelled, thereby making it possible to shorten the target signal reach time at the time of application of a power voltage.

In FIG. 5(C), the time Th is a time required to initially heat the second heat sensitive element 2 as in Embodiment 1.

Embodiment 3

In the above Embodiment 1, the filter circuit is provided on the non-inversion input terminal side of the operation amplifier 10. In this Embodiment 3, as shown in FIG. 6(A), one end of a capacitor 22 is connected to a terminal T and to one end of the fixed resistor 13, the other end of the capacitor 22 is connected to one end of a fixed resistor 21, the other end of the fixed resistor 21 is connected to the other end of the fixed resistor 13 and to the non-inversion input terminal of the operation amplifier 10, and a filter circuit composed of the fixed resistor 21 and the capacitor 22 is provided to control the potential of the non-inversion input terminal of the operation amplifier 10. Alternatively, as shown in FIG. 6(B), there may be provided a filter circuit composed of (1) a fixed resistor 23 one end of which is connected to the other end of the fixed resistor 13 and to the non-inversion input terminal of the operation amplifier 10 and (2) a capacitor 24 one end of which is connected to the other end of the fixed resistor 23 and the other end of which is grounded to the earth. Thus, the source current I9 for canceling an output error can be supplied like Embodiments 1 and 2 even when the potential of the non-inversion input terminal which is a reference potential for the operation of the operation amplifier 10 is controlled.

Embodiment 4

In the above Embodiment 1, the primary filter circuit is provided. In this Embodiment 4, a secondary filter circuit composed of fixed resistors 25 and 26 and capacitors 27 and 28 is provided. As shown in FIG. 7(A), one end of the fixed resistor 25 is connected to the other end of the fixed resistor 16 and to the emitter terminal of the transistor 12, the other end of the fixed resistor 25 is connected to one end of the fixed resistor 26 and to one end of the capacitor 27, the other ends of the fixed resistor 26 and the capacitor 27 are connected to one end of the capacitor 28, and the other end of the capacitor 28 is grounded. Alternatively, a secondary filter circuit composed of fixed resistors 29 and 30 and capacitors 31 and 32 may be provided. As shown in FIG. 7(B), one end of the fixed resistor 29 is connected to the other end of the fixed resistor 16 and to the emitter terminal of the transistor 12, the other end of the fixed resistor 29 is connected to one end of the fixed resistor 30 and to one end of the capacitor 31, the other ends of the fixed resistor 30 and the capacitor 31 are connected to one end of the capacitor 32, and the other end of the capacitor 32 is connected to the terminal Vcc to which a power voltage is supplied.

When an output error is canceled with the secondary filter circuit, the output (charge) of the secondary filter circuit changes more sharply than the primary filter circuit, thereby making it possible to further shorten the target signal reach time at the time of application of a power voltage. An active filter using an operation amplifier may be provided. A secondary or higher-order filter circuit may also be provided.

Embodiment 5

In the above Embodiment 1, the offset voltage $\Delta E$ is controlled by the filter circuit incorporated in the power source 9. In this Embodiment 5, as shown in FIG. 8, a primary or secondary filter circuit 50 like one described above is provided between the power source 9 and a terminal to which a voltage Vcc is supplied so that the rise of the voltage Vcc is delayed as shown by the waveform E of FIG. 9(A) to delay the supply of the offset voltage $\Delta E$ so as to provide the same performance as in Embodiments 1, 2, 3 and 4. E of FIG. 9 shows the waveform of the circuit of the present invention and F shows the waveform of the circuit of the prior art.

Embodiment 6

In the above Embodiment 1, the filter circuit is grounded to the earth. In the Embodiment 2, the filter circuit is connected to the terminal to which a voltage Vcc is supplied. In this Embodiment 6, a switching means for selecting between the grounding of the filter circuit to the earth or the connection of the filter circuit to the terminal to which the voltage Vcc is supplied is provided. Since the internal configuration of the filter circuit is the same, the switching means makes it easy to select a method for changing the offset voltage $\Delta E$. This can be effected by connecting a jumper wire (not shown) to the switching means. This switching means may be provided in the heat sensitive flow meters of FIG. 6(A), FIG. 6(B), FIG. 7(A) and FIG. 7(B).

As having been described above, according to the first aspect of the present invention, the power source for supplying an offset voltage to the input circuit of the differential amplifier is provided and offset voltage changing means for temporarily changing the offset voltage at the time of application of a power voltage is provided. Therefore, an output error right after the application of a power voltage can be suppressed and the target signal reach time can be shortened.

According to the second aspect of the present invention, since the offset voltage changing means adds the offset voltage at the time of application of a power voltage and gradually reduces the offset voltage, an output error right after the application of a power voltage can be suppressed and the target signal reach time can be shortened.

According to the third aspect of the present invention, since the offset voltage changing means subtracts the offset voltage at the time of application of a power voltage and gradually reduces the offset voltage, even if heat transmitted to the support section from the second sensitive heat element exists, the time constant of the filter circuit is adjusted to cancel this heat time constant and an output error can be canceled.

According to the fourth aspect of the present invention, since the offset voltage changing means is composed of a primary filter circuit and the time constant of the filter circuit is set to almost the same value as the heat time constant of the second heat sensitive element, an output error right after the application of a power voltage can be suppressed and the target signal reach time can be shortened.

According to the fifth aspect of the present invention, since the offset voltage changing means is composed of a secondary or higher-order filter circuit and the time constant of the filter circuit is set to almost the same value as the heat time constant of the second heat sensitive element, the target signal reach time can be shortened.

What is claimed is:

1. A heat sensitive flow meter comprising:
    a bridge circuit having a first heat sensitive element for measuring a temperature of a fluid in a first bridge branch and a second heat sensitive element which generates heat with a heating current and is cooled by a flow of the fluid in a second bridge branch;
    a differential amplifier for amplifying a potential difference between the first and second heat sensitive elements;
    a fixed temperature difference control circuit for controlling the heating current so that a temperature difference between the first and second heat sensitive elements becomes fixed;
    a power source for supplying an offset voltage to an input circuit of the differential amplifier; and
    an offset voltage changing means for temporarily changing the offset voltage at the time of application of a power voltage.

2. The heat sensitive flow meter of claim 1, wherein the offset voltage changing means adds the offset voltage at the time of application of a power voltage and gradually reduces the offset voltage.

3. The heat sensitive flow meter of claim 1, wherein the offset voltage changing means subtracts the offset voltage at the time of application of a power voltage and gradually reduces the offset voltage.

4. The heat sensitive flow meter of claim 1, wherein the offset voltage changing means is composed of a primary filter circuit and a time constant of the primary filter circuit is set to almost a same value as a heat time constant of the second heat sensitive element.

5. The heat sensitive flow meter of claim 1, wherein the offset voltage changing means is composed of a secondary or higher-order filter circuit and a time constant of the filter circuit is set to almost a same value as a heat time constant of the second heat sensitive element.

6. The heat sensitive flow meter of claim 1, wherein an input to the offset voltage changing means is independent from an output of the bridge circuit.

* * * * *